United States Patent
Burbaum et al.

(10) Patent No.: US 10,144,092 B2
(45) Date of Patent: Dec. 4, 2018

(54) LASER METHOD WITH DIFFERENT LASER BEAM AREAS WITHIN A BEAM

(71) Applicant: SIEMENS AKTIENGESELLSCHAFT, München (DE)

(72) Inventors: Bernd Burbaum, Falkensee (DE); Norbert Pirch, Aachen (DE)

(73) Assignee: SIEMENS AKTIENGESELLSCHAFT (DE)

( * ) Notice: Subject to any disclaimer, the term of this patent is extended or adjusted under 35 U.S.C. 154(b) by 0 days.

(21) Appl. No.: 14/773,508

(22) PCT Filed: Feb. 18, 2014

(86) PCT No.: PCT/EP2014/053072
§ 371 (c)(1),
(2) Date: Sep. 8, 2015

(87) PCT Pub. No.: WO2014/135362
PCT Pub. Date: Sep. 12, 2014

(65) Prior Publication Data
US 2016/0016263 A1  Jan. 21, 2016

(30) Foreign Application Priority Data
Mar. 7, 2013 (EP) .................... 13158179

(51) Int. Cl.
*B23K 26/00* (2014.01)
*B23K 26/342* (2014.01)
(Continued)

(52) U.S. Cl.
CPC ........ *B23K 26/342* (2015.10); *B23K 26/0006* (2013.01); *B23K 26/0081* (2013.01);
(Continued)

(58) Field of Classification Search
CPC ................ B23K 26/06; B23K 26/0604; B23K 26/0608; B23K 26/0673; B23K 26/0676
(Continued)

(56) References Cited

U.S. PATENT DOCUMENTS 4,275,288 A * 6/1981 Makosch ............. B23K 26/073
219/121.63
6,872,912 B1 * 3/2005 Wos ........................ B23K 26/18
148/524
(Continued)

FOREIGN PATENT DOCUMENTS

DE 4034745 A1 7/1991
EP 2186594 A1 5/2010
(Continued)

OTHER PUBLICATIONS

International Search Report; PCT/EP2014/051408; International Filing Date: Jan. 24, 2014; 3 Pgs.

*Primary Examiner* — Dana Ross
*Assistant Examiner* — Ayub Maye
(74) *Attorney, Agent, or Firm* — Schmeiser, Olsen & Watts, LLP

(57) ABSTRACT

The use of a laser beam, which has an external and an internal laser beam area with different intensities allows a higher temperature gradient to be produced along the z direction, is provided.

14 Claims, 1 Drawing Sheet

(51) Int. Cl.
*B23K 26/06* (2014.01)
*B23K 26/067* (2006.01)

(52) U.S. Cl.
CPC .......... *B23K 26/06* (2013.01); *B23K 26/0648* (2013.01); *B23K 26/0676* (2013.01)

(58) Field of Classification Search
USPC .............. 219/121.6, 121.61, 121.63, 121.64, 219/121.65, 121.77
See application file for complete search history.

(56) References Cited

U.S. PATENT DOCUMENTS

| | | | | |
|---|---|---|---|---|
| 7,173,212 | B1* | 2/2007 | Semak | B23K 26/0604 219/121.61 |
| 8,350,188 | B2* | 1/2013 | Schulz | B23K 26/0604 219/121.67 |
| 9,500,781 | B2* | 11/2016 | Watanabe | B23K 26/0648 |
| 2004/0173588 | A1* | 9/2004 | Benz | H01T 21/02 219/121.64 |
| 2005/0100703 | A1* | 5/2005 | Terada | B29C 65/1635 428/57 |
| 2005/0218122 | A1* | 10/2005 | Yamamoto | B23K 26/0624 219/121.61 |
| 2010/0206855 | A1* | 8/2010 | Mokadem | B23K 10/02 219/121.46 |
| 2011/0089150 | A1* | 4/2011 | Arjakine | B23K 26/32 219/121.64 |
| 2011/0100964 | A1* | 5/2011 | Burbaum | B23K 26/03 219/121.64 |
| 2012/0266814 | A1* | 10/2012 | Clark | B23K 26/0643 118/620 |
| 2012/0267345 | A1* | 10/2012 | Clark | B23K 26/0643 219/121.35 |
| 2012/0267347 | A1* | 10/2012 | Arjakine | B05B 7/228 219/121.64 |

FOREIGN PATENT DOCUMENTS

| | | |
|---|---|---|
| JP | H04182087 A | 6/1992 |
| JP | H04182088 A | 6/1992 |
| WO | WO2012/007326 | 1/2012 |

* cited by examiner

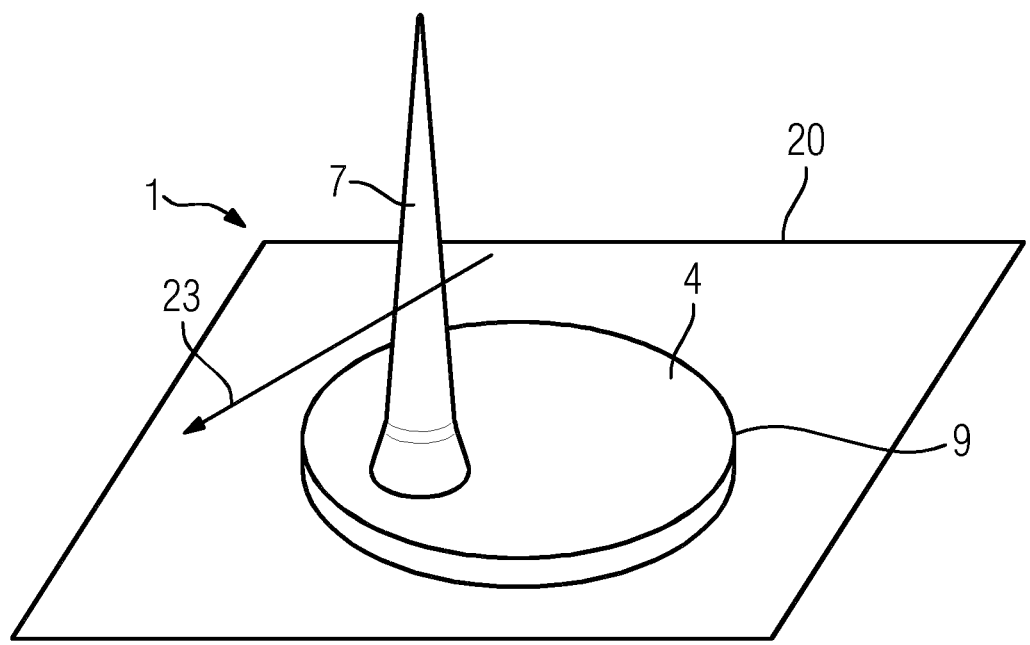

LASER METHOD WITH DIFFERENT LASER BEAM AREAS WITHIN A BEAM

CROSS-REFERENCE TO RELATED APPLICATIONS

This application claims priority to PCT Application No. PCT/EP2014/053072 having a filing date of Feb. 18, 2014 based off of EP Application No. 13158179.5 having a filing date of Mar. 7, 2013, the entire contents of which are hereby incorporated by reference.

FIELD OF TECHNOLOGY

The following relates to lasering in which a laser beam that has two different laser beam areas is used.

BACKGROUND

Laser welding methods for remelting cracks or for deposition welding on a substrate are state of the art.

When welding, there is generally the problem that cracks can occur within remelted material or deposition welding.

This has so far been solved by the entire component being preheated.

In the case of monocrystalline rewelding or monocrystalline deposition welding, one object is to produce a temperature zone with a temperature gradient in which the Z component dominates the other two components at the solidification front.

In addition, the temperature zone should be designed such that thermal compressive stresses are produced in the trailing area.

SUMMARY

An aspect relates to a method and a device with which this can be made easier.

Embodiments of the invention simplify the operative and procedural preheating during welding and the production of temperature zones that are conducive to monocrystalline growth.

BRIEF DESCRIPTION

Some of the embodiments will be described in detail, with reference to the following figures, wherein like designations denote like members, wherein:

FIG. 1 schematically shows an embodiment of the invention.

DETAILED DESCRIPTION

The FIGURE and the description represent only exemplary embodiments of the invention.

In the FIGURE, an intensity distribution of a laser beam 1 is shown.

An internal laser beam area 7 is arranged non-concentrically in relation to an external laser beam area 4.

Inside a laser beam 1 there is an internal laser beam area 7, which has a higher intensity or a higher power output, particularly of 30-1000 W/mm², most particularly 100-300 W/mm², and can remelt a crack or can melt material for deposition welding.

The internal laser beam area 7 is surrounded, preferably completely, by an external laser beam area 4, which has a greater cross section, particularly a greater diameter, and has a lower intensity or a lower laser output, so that the external laser beam area 4 only pre-heats and post-heats the area before and after the internal laser beam area 7.

The diameter of the internal laser beam area 7 is preferably 1 mm and that of the external laser beam area 4 is 4 mm.

The internal area 7 is preferably arranged non-concentrically in the external laser beam area 4.

This intensity distribution has the effect of increasing the temperature gradient in the radiating direction of the laser beam 1 and such a laser beam 1 can preferably be used in monocrystalline remelting or deposition welding.

An example of a substrate that has a directionally solidified structure is PWA 1483SX, which produces a monocrystalline structure.

The ratio of the intensities or the outputs of the laser beam areas 4, 7 in relation to one another is at least 1.5, in particular at least 2.

The surface area of the internal laser beam area 7 is preferably a maximum of 25% of the external laser beam area 4.

Seen in the running direction 23 of the laser beam 1, the internal laser beam area 7 is closer to the remelting area.

Seen in the running direction 23 of the laser beam 1, the internal laser beam area 7 is arranged in front, that is to say impinges first on the substrate 20.

The internal laser beam area 7 may be arranged with its periphery at the periphery 9 of the external laser beam area 4 (not represented) or be at a distance from the edge of the external laser beam area 4.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for a laser machining of a substrate, in which a crack is remelted or material is deposited, comprising:
increasing a temperature gradient in a radiating direction of a laser beam for the laser machining, by creating an intensity distribution between two different, mutually asymmetrical laser beam areas, wherein the laser beam has an internal laser beam area, which is completely surrounded by an external laser beam area, wherein the internal laser beam area has a higher power output than the external laser beam area at a same time during a welding period of the laser machining of the substrate; pre-heating an area of the substrate with the external laser beam area before the internal laser beam area impinges on the area of the substrate; applying the internal laser beam area to the area of the substrate for remelting the crack or depositing material; post-heating the area of the substrate with the external laser beam area after the internal laser beam impinges on the area of the substrate
and the internal laser beam area is arranged in front of the external laser beam area in a running direction of the laser beam.

2. The method as claimed in claim 1, the external laser beam area having a lower laser output or leading to a lower level of heating of the substrate.

3. The method as claimed in claim 1, in which the substrate is a metallic substrate that is treated.

4. The method as claimed in claim 1, in which the crack is remelted.

5. The method as claimed claim 1, in which deposition welding takes place.

6. The method as claimed in claim 1, in which a one intensity or a one output of the internal laser beam area is at least 1.5 times as great as an intensity or an output of the external laser beam area.

7. The method as claimed in claim 1, in which a surface area of the internal laser beam area on the substrate is a maximum of 25% of a surface area of the external laser beam area on the substrate.

8. The method as claimed claim 1, in which a power output of the internal laser beam area is 30-1000 W/mm$^2$.

9. The method as claimed in claim 1, in which the internal laser beam area is arranged with a periphery of the internal laser beam area at a periphery of the external laser beam area.

10. The method as claimed in claim 1, in which the internal laser beam area is at a distance from a periphery of the external laser beam area.

11. The method as claimed in claim 1, in which a one intensity or a one output of the internal laser beam area is at least 2 times as great as an intensity or an output of the external laser beam area.

12. The method as claimed claim 1, in which a power output of the internal laser beam area is 100-300 W/mm$^2$.

13. The method as claimed in claim 1, wherein the laser beam has only two different beam areas of differing intensity.

14. The method as claimed in claim 1, wherein the internal laser beam area is assymetric in an X axis and asymetric in a Y axis.

* * * * *